United States Patent [19]
Arya

[11] 3,889,156

[45] June 10, 1975

[54] DOUBLE TUNED RETRACE DRIVEN HORIZONTAL DEFLECTION CIRCUIT

[75] Inventor: Manohar L. Arya, Hoffman Estates, Ill.

[73] Assignee: Warwick Electronics Inc., Chicago, Ill.

[22] Filed: Sept. 21, 1973

[21] Appl. No.: 399,988

[52] U.S. Cl. .................................. 315/408; 315/406

[51] Int. Cl. ............................................ H01j 29/70

[58] Field of Search ......... 315/27 TD, 27 R, 28, 29, 315/406, 408

[56] References Cited

UNITED STATES PATENTS

| | | | |
|---|---|---|---|
| 3,189,782 | 6/1965 | Heffron | 315/27 R |
| 3,210,601 | 10/1965 | Walker | 315/27 TD |
| 3,229,150 | 1/1966 | Greep et al. | 315/27 TD |
| 3,323,001 | 5/1967 | Mackellar | 315/27 TD |
| 3,466,496 | 9/1969 | Geller et al. | 315/27 TD |
| 3,500,116 | 3/1970 | Rietveld et al. | 315/27 TD |

*Primary Examiner*—Maynard R. Wilbur
*Assistant Examiner*—G. E. Montone
*Attorney, Agent, or Firm*—Hofgren, Wegner, Allen, Stellman & McCord

[57] ABSTRACT

A horizontal scanning circuit for a television receiver includes a capacitor in series between a voltage supply and a primary winding of a transformer having a secondary winding coupled to a deflection winding. During the trace period, the capacitor is charged through the series circuit. During the retrace period, a horizontal sync pulse enables a thyristor to discharge the capacitor through an inductor in shunt with the charge circuit. The capacitor is resonant with the inductance of the transformer primary winding at a fundamental frequency related to the retrace period, and is resonant with the inductance of the transformer primary winding and reflected inductance of the transformer secondary winding at a higher frequency such as the third harmonic to decrease the total current flow at the end of the retrace period to automatically disable the thyristor.

10 Claims, 4 Drawing Figures

DOUBLE TUNED RETRACE DRIVEN HORIZONTAL DEFLECTION CIRCUIT

BACKGROUND OF THE INVENTION

This invention relates to a simplified scanning circuit for a television receiver, and more particularly to a horizontal deflection circuit which is double tuned in order to disable a retrace driven thyristor.

Horizontal deflection circuits in solid state television receivers have used a thyristor such as an SCR, which is driven on during either the trace or retrace periods in order to generate the deflection current for a deflection yoke. For example, U.S. Pat. No. 2,995,679 to Skoyles, shows a circuit in which supply voltage charges a capacitor through a series inductor which can be resonant therewith. After the capacitor is charged, a controlled switch is enabled in order to discharge the capacitor through an inductor in a discharge circuit and thus generate a scanning current.

Retrace driven deflection circuits are of simple design, and generally can utilize a single thyristor such as an SCR. However, a turn-off network must be provided to disable the SCR during the trace period. To overcome various problems with retrace driven circuits, trace driven deflection circuits have been developed. For example, U.S. Pat. No. 3,189,782 to Heffron shows a horizontal scanning circuit in which an SCR and a diode are turned on twice during each trace period, due to second harmonic tuning produced by an inductor and a capacitor. In U.S. Pat. No. 3,449,623 to Dietz, a pair of SCR's are utilized to generate the deflection waveform. A retrace driven SCR in conjunction with a resonant commutating circuit serves to turn off a trace driven SCR in order to initiate the retrace period. The commutating circuit then turns off the retrace driven SCR before the end of the retrace period. All such circuits are very complex, and lack the simplicity of retrace driven scanning circuits which utilize a single SCR.

SUMMARY OF THE INVENTION

In accordance with the present invention, a novel scanning circuit is disclosed which is inexpensive, reliable, and simple in construction. A single thyristor is retrace driven to build up deflection current in the yoke, during the retrace period. No linearity or centering controls are necessary. The necessity for a turn-off network is eliminated by double tuned resonance which reduces the current through the thyristor to zero at the end of the retrace period. The only parameters used to develop the circuit values are the retrace time, and the energy needs of the circuit.

One object of the present invention is the provision of an improved scanning circuit of simple design and which uses a single thyristor which is retract driven.

Other objects and features of the invention will be apparent from the following description and from the drawings. While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

DESCRIPTION OF THE PREFERRED EMBODIMENT

Figure 1:
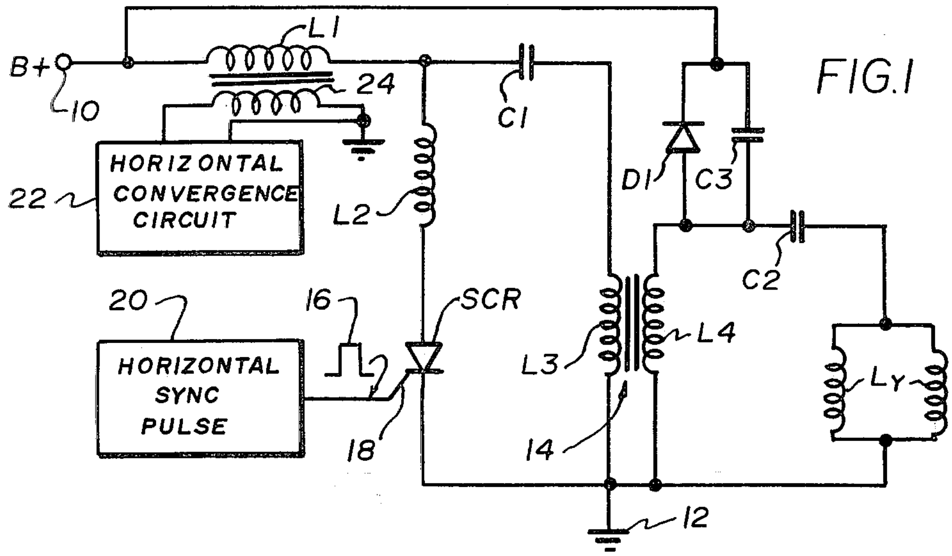
FIG. 1 is a schematic diagram of the novel scanning circuit.

In FIG. 1, a horizontal scanning circuit for a television receiver generates a generally sawtooth deflection current in a deflection or yoke winding $L_y$. A charging path includes a reactive impedance which can store energy, such as a capacitor C1, in series with an inductor L1 and an inductor L3. The charge circuit is connected between a source 10 of DC voltage or B+, and reference ground 12. The charge circuit is shunted by a discharge circuit including an inductor L2 and a series thyristor, such as an SCR, connected in shunt between ground 12 and a junction between capacitor C1 and inductor L3. The inductor L3 is the primary winding of a flyback transformer 14 which has a secondary winding L4 connected in series with a capacitor C2 and the yoke winding $L_y$. The B+ supply is coupled through the parallel combination of a capacitor C3 and a diode D1 to the junction between inductor L4 and capacitor C2.

The scanning circuit is retrace driven by horizontal sync pulses 16 coupled to a gate terminal 18 of the SCR. The horizontal sync pulse 16 is supplied from a conventional horizontal sync pulse generating circuit 20, such as the horizontal oscillator stage of a transistorized television receiver. A pair of main power terminals of the SCR are coupled between ground 12 and inductor L2.

Figures 2A, 2B, 2C:
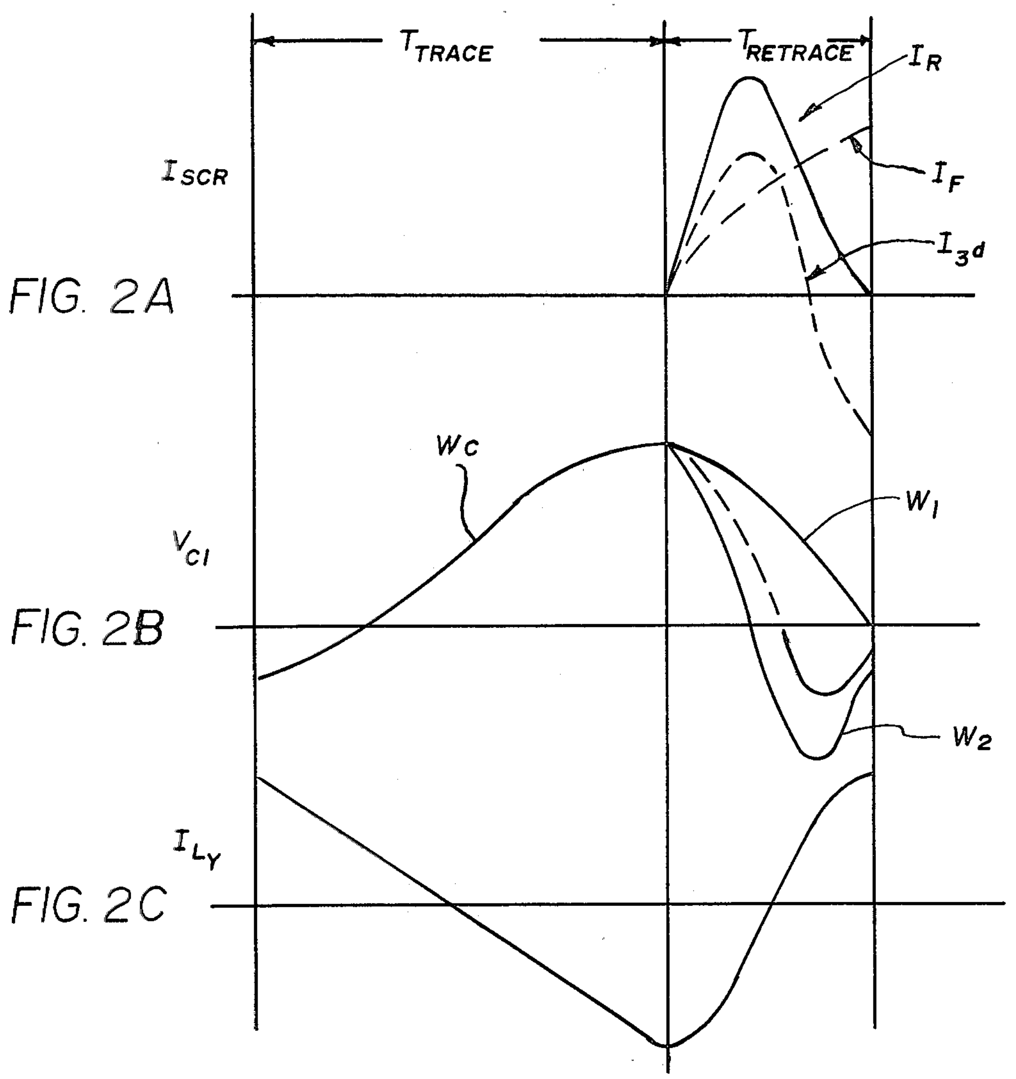
FIGS. 2A, 2B and 2C are waveform curves showing the operation of the circuit of FIG. 1.

The operation of the circuit of FIG. 1 will now be described with reference to the waveforms generated therein, as illustrated in FIGS. 2A, 2B and 2C. During the trace period or interval, capacitor C1 is charged from the B+ voltage supply through the charging inductor L1. The resulting voltage $V_{C1}$ on capacitor C1 varies as shown in FIG. 2B. The component values of capacitor C1 and charging inductor L1 are selected to be resonant at a frequency Wc so that the voltage $V_{C1}$ is at its maximum value at its end of the trace period $T_{TRACE}$.

At the end of the trace period, the SCR is triggered by the horizontal sync pulse 16, causing the fully charged capacitor C1 to discharge through the SCR and inductors L2 and L3. During the retrace period, all energy which has been stored in capacitor C1 during the trace period is discharged and transferred through primary winding L3 and via secondary winding L4 to the yoke inductance $L_y$.

At the end of the retrace period, T retrace, the current through the SCR goes to zero due to double tuning as will be explained, causing the SCR to be turned off. The switching off of the SCR, and the resulting interruption of the driving current, produces an inductive voltage in secondary winding L4 which results in a positive voltage at the anode of diode D1. The diode D1 is not driven conductive and returns the energy stored in the yoke winding $L_y$ during the retrace period back to the voltage supply 10. This operation is seen in FIG. 2C, in which the yoke winding current $I_{LY}$ reaches its maximum negative peak at the start of the retrace period. At the end of the trace period, the diode D1 turns off and the retrace period begins again.

The component values for the circuit can be derived by considering the energy needs of the circuit, including the tuning considerations, and the trace and retrace time values. The discharge path for the reactive storage inductor C1, at the fundamental frequency during the retrace period, includes series inductors L2 and L3. The fundamental frequency current $I_F$ through the SCR is shown by dashed lines in FIG. 2A, and is selected to be approximately 90° or one-fourth of a sinusoidal cycle. Therefore, the relation for the fundamental tuning frequency W1 is given by:

$$W1 T_R = \frac{\pi}{2} \text{ or } W1 = \frac{\pi}{2T_R} \quad (1)$$

For greatest efficiency the circuit should be tuned, and from standard circuit equations, the fundamental frequency tuning for the retrace or discharge circuit which includes the series inductors L2 and L3 and capacitor C1, is given by:

$$W1 = \frac{1}{\sqrt{(L2 + L3)\ C1}} \quad (2)$$

At the end of the retrace period, the SCR should be turned off. The necessity for a turn-off network is eliminated by insuring that the current through the SCR changes direction or at least is reduced below the value of the holding current for the SCR at the end of the retrace period. Since the current at the fundamental frequency $W_1$ will be a maximum at this time, another opposing current of approximately equal magnitude but opposite polarity is needed. This is accomplished by generating a third harmonic frequency current $I_{3d}$, also shown in FIG. 2A by a dashed line. The combination of the fundamental frequency $I_F$ with the third harmonic frequency $I_{3d}$ results in a total retrace current $I_R$, shown in solid lines in FIG. 2A, which is forced to zero at the end of the retrace period.

To provide efficient energy transfer to the yoke winding, the circuit including both the primary and the secondary of the transformer 14 should be tuned to this third harmonic frequency. As can be seen in FIG. 2A, the third harmonic $I_{3d}$ will have passed through approximately 270° at the end of the retrace period, $$\text{therefore:} \quad W2\ T_R = \frac{3\pi}{2} \text{ or } W2 = \frac{3\pi}{2\ T_R} \quad (3)$$

Comparing equations (1) and (3) results in:

$$W2 = 3W1 = \sqrt{\frac{3}{(L2 + L3\ \ C1}} \quad (4)$$

For minimum energy circulation:

$$L3 \geq 2L2 \quad (5)$$

Substituting relationship (5) in equation (4) leads to:

$$W2 = \frac{3}{\sqrt{3\ L2\ C1}} = \frac{1}{\sqrt{1/3\ L2\ C1}} \quad (6)$$

Equation (6) can be derived in another manner. For minimum energy circulation, the reflected inductance of the secondary winding L4 should be equal to the parallel inductance combination in the primary driving circuit. For the primary:

$$L2 \parallel L3 = L2 \parallel 2L2 = 2/3\ L2 \quad (7)$$

The total effective inductance is:

$$2/3\ L2 \parallel 2/3\ L2 = 1/3\ L2 \quad (8)$$

The harmonic tuning is then given as:

$$W2 = \frac{1}{\sqrt{1/3\ L2\ C1}} \quad (9)$$

which is identical to equation (6).

The time constant for the circuit can now be developed based on the retrace time. Combining equations (2) and (5) produces the following:

$$(W1)^2 = \frac{1}{3\ L2C1} \quad (10)$$

$$3W1 \cdot W1\ \frac{1}{L2\ C1} \quad (11)$$

$$W2\ \ W1\ \frac{1}{L2\ C1} \quad (12)$$

$$L2\ C1 = \frac{1}{W1\ W2} = \frac{2\ T_R \cdot 2T_R}{\pi \cdot 3\pi} = \frac{4T_R^2}{3\pi^2} \quad (13)$$

For efficient energy transfer, secondary tuning components $L_y$ and $C_3$ should have the same time constant, hence:

$$L2\ C1 = L_Y\ C3 \quad (14)$$

From equation (14) transformer ratio can be determined.

In the standard U.S. television system, the trace period $T_T$ is approximately 53.5 microseconds and the retrace period $T_R$ is approximately 10 microseconds. During the trace period the voltage travels through 180°, and so the fundamental trace frequency $f_c$ is:

$$fc = \frac{1}{2T_T} = 9.345\ KH_z \quad (15)$$

and as seen in FIG. 2A, the fundamental frequency during the retrace period travels through only 90° and hence:

$$fR = \frac{1}{4T_R} - 25\ KH_z \quad (16)$$

While equation (15) indicates that the fundamental trace frequency is 9.345 KHz, the retrace current $W_1$ of FIG. 2B is present in the primary circuit and the best results are obtained if the current requirements are related, as by:

$$WC = \frac{1}{3} W1 \text{ or } fC = \frac{1}{3} fR = 8.33\ KH_z \quad (17)$$

The frequency relation of equation 17 is a good compromise and gives a frequency more than half the horizontal line frequency of 15.75 KHz. From standard circuit equations, $$WC = \frac{1}{L1\ C1} \quad (18)$$

$$W1^2 = 9WC^2 = \frac{9}{L1\ C1} = \frac{1}{3L2\ C1} \quad (19)$$

$$L1 = 27L2 \quad (20)$$

Thus the above derived equations have developed all circuit component values, by using the trace and retrace time values, and the energy needs and tuning requirements of the circuit. Thus the above derived equations have developed all circuit component values, and the energy needs and tuning requirements of the circuit.

The waveform derived from the double tuned retrace driven deflection circuit of FIG. 1 can be used to directly drive a horizontal convergence circuit 22. This allows elimination of the tuning components heretofore necessary in the input to a horizontal convergence circuit to develop an S shaped waveform. The S shaped waveform across coil L1, which is already of the proper shape, is coupled to a mutually coupled coil 24 and then to the energizing input of the horizontal convergence circuit 22. This minimizes interaction between the voltage source for energizing the horizontal convergence circuit and the horizontal deflection circuit. Other uses of the illustrated circuit, and modifications therein, may be made without departing from the present invention.

The embodiments of the invention in which an exclusive property or privilege is claimed are defined as follows:

1. A scanning circuit for producing in a deflection winding a generally sawtooth deflection current having a trace period and a retrace period, comprising:

a voltage source;

a reactive impedance for storing energy;

coupling means for supplying current to said deflection winding;

a charge circuit for charging the reactive impedance from said voltage source during the trace period;

a semiconductor device having a first state, and a second state occurring in response to a predetermined electrical flow;

a discharge circuit energized by said semiconductor device during the retrace period for discharging the reactive impedance through said coupling means to produce in said deflection winding a generally sawtooth current, said discharge circuit being resonant at a first frequency related to the retrace period for generating a fundamental current flow through said semiconductor device and resonant at a second frequency higher than the first frequency for generating at the end of a said retrace period a secondary current flow which switches said device to said first state.

2. The scanning circuit of claim 1 wherein said discharge circuit is resonant at a second frequency which comprises an odd harmonic of the first frequency.

3. The scanning circuit of claim 1 wherein said coupling means comprises a transformer having a primary winding connected in series with said reactive impedance and a secondary winding connected with said deflection winding.

4. The scanning circuit of claim 3 wherein said reactive impedance comprises a capacitor, and said charge circuit includes an inductor in series with the capacitor and the primary winding of the transformer for charging the capacitor from the voltage source.

5. The scanning circuit of claim 3 wherein said reactive impedance comprises a capacitor, and said discharge circuit includes an inductor, in series with said capacitor and said primary winding when said thyristor is in its second state, said inductor, capacitor, and primary winding being resonant at both said first and second frequencies.

6. The scanning circuit of claim 3 including a diode coupled between said deflection winding and said voltage source and forming a return path for current from said deflection winding.

7. The scanning circuit of claim 1 wherein said semiconductor device has the first power terminal, a second power terminal, and a gate terminal, a source of horizontal sync pulses, and means coupling said horizontal sync pulse source to said gate terminal to drive said semiconductor device into a conductive state, corresponding to said first state, during the retrace period to discharge the energy stored in the reactive impedance.

8. The scanning circuit of claim 1 wherein said reactive impedance comprises a capacitor, said charge circuit includes a first inductor in series between said voltage source and said capacitor, and said discharge circuit eliminates said first inductor and substitutes a second inductor coupled to a junction between said first inductor and said capacitor.

9. The scanning circuit of claim 8 wherein said coupling means comprises a transformer having a primary winding and a secondary winding, said primary winding being in both said charge circuits and said discharge circuit, and means coupling said secondary winding to said deflection winding.

10. The scanning circuit of claim 9 wherein said means coupling said secondary winding includes a second capacitor coupled between said secondary winding and said deflection winding, and a diode and capacitor network coupled between said second capacitor and said voltage source.

* * * * *